(12) United States Patent
Murakawa

(10) Patent No.: US 9,294,636 B2
(45) Date of Patent: Mar. 22, 2016

(54) IMAGE FORMING APPARATUS THAT HAS INTERNET FACSIMILE FUNCTION AND STORES MESSAGE ID RELATED TO IMAGE DATA IN NON VOLATILE MEMORY

(71) Applicant: KYOCERA Document Solutions Inc.

(72) Inventor: Tsuyoshi Murakawa, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/285,345

(22) Filed: May 22, 2014

(65) Prior Publication Data

US 2014/0355070 A1    Dec. 4, 2014

(30) Foreign Application Priority Data

Jun. 3, 2013    (JP) ................................. 2013-117409

(51) Int. Cl.
*H04N 1/00* (2006.01)
*H04L 12/58* (2006.01)

(52) U.S. Cl.
CPC ....... *H04N 1/00233* (2013.01); *H04N 1/00212* (2013.01); *H04N 1/00222* (2013.01); *H04L 12/5875* (2013.01); *H04L 51/30* (2013.01); *H04N 2201/3218* (2013.01); *H04N 2201/3219* (2013.01)

(58) Field of Classification Search
None
See application file for complete search history.

(56) References Cited

U.S. PATENT DOCUMENTS

| 6,496,573 | B1 | 12/2002 | Ichimura | |
|---|---|---|---|---|
| 2005/0073665 | A1* | 4/2005 | Taniguchi et al. | 355/53 |
| 2008/0180742 | A1* | 7/2008 | Koike | 358/1.15 |
| 2011/0170134 | A1* | 7/2011 | Murashima | 358/1.15 |
| 2011/0314319 | A1* | 12/2011 | Kurahashi | 713/340 |
| 2012/0293836 | A1* | 11/2012 | Hiraike | 358/1.15 |

FOREIGN PATENT DOCUMENTS

| JP | 2000-270185 | 9/2000 |
|---|---|---|
| JP | 2000-295404 | 10/2000 |
| JP | 2002-073491 | 3/2002 |
| JP | 2002-320068 | 10/2002 |
| JP | 2007-235330 | 9/2007 |
| JP | 2009-049888 | 3/2009 |
| JP | 2009-188786 | 8/2009 |

* cited by examiner

Primary Examiner — Miya J Cato

(57) ABSTRACT

In an image forming apparatus, a facsimile device includes a non volatile memory in which received image data of facsimile is stored. A mail processing unit receives an email of internet facsimile from a mail server. An image processing unit generates received image data of internet facsimile on the basis of the received email. A job managing unit stores the receive image data of internet facsimile in the non volatile memory, and performs printing of the received image data stored in the non volatile memory. The job managing unit stores a message ID of the receive email in the non volatile memory with the received image data of internet facsimile. The open confirmation processing unit acquires destination information for an open confirmation email from the received email corresponding to the stored message ID and transmits the open confirmation email to a destination specified by the acquired destination information.

1 Claim, 5 Drawing Sheets

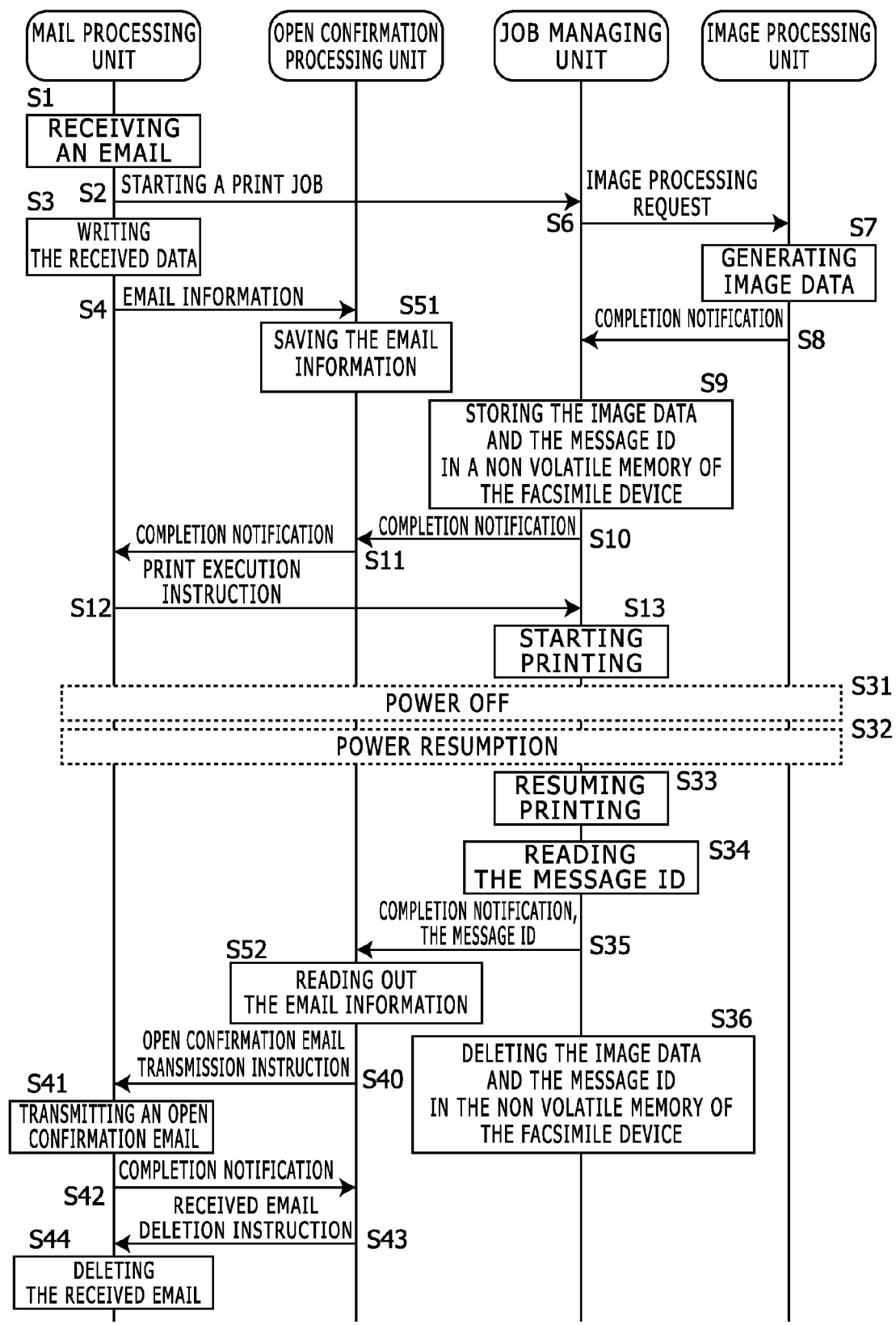

ID RELATED TO IMAGE

IMAGE FORMING APPARATUS THAT HAS INTERNET FACSIMILE FUNCTION AND STORES MESSAGE ID RELATED TO IMAGE DATA IN NON VOLATILE MEMORY

CROSS-REFERENCE TO RELATED APPLICATIONS

This application relates to and claims priority rights from Japanese Patent Application No. 2013-117409, filed on Jun. 3, 2013, the entire disclosures of which are hereby incorporated by reference herein.

BACKGROUND

1. Field of the Present Disclosure

The present disclosure relates to an image forming apparatus.

2. Description of the Related Art

Some image forming apparatuses have not only a facsimile function that uses a telephone line but an internet facsimile function that uses emails transmitted and received through a computer network.

Such internet facsimile function is capable of requesting to send an open confirmation email by describing a transmission request of an open confirmation email in an original email.

In order to guarantee to keep image data based on a received email until printing in the aforementioned internet facsimile function, as well as the received image data of the facsimile function, the image data of the internet facsimile function is stored in a non volatile memory in which the received image data of the facsimile function is stored. In this situation, the facsimile function stores only received image data in the non volatile memory and the internet facsimile function also stores only received image data in the non volatile memory in the same storing manner. Consequently, keeping the received image data is guaranteed, and even if power off occurs in the image forming apparatus before printing, printing an image based on the image data is started or resumed after power resumption.

In the facsimile function, a sender is enabled to detect whether facsimile data was successfully received through a telephone line or not, and therefore a sender can confirm the reception. On the other hand, in the internet facsimile, a sender confirms the reception by receiving an open confirmation email.

Therefore, in the internet facsimile function, if the power off occurs after the received image data is stored in a non volatile memory of a facsimile device and before an open confirmation email is transmitted, destination information of the open confirmation email disappears, and consequently, it becomes difficult to transmit the open confirmation email.

SUMMARY

An image forming apparatus according to an aspect of the present disclosure includes a facsimile device that includes a non volatile memory in which received image data of facsimile is stored; a mail processing unit configured to receive an email of internet facsimile from a mail server; an image processing unit configured to generate received image data of internet facsimile on the basis of the email received by the mail processing unit; a job managing unit configured (a) to store the receive image data of internet facsimile in the non volatile memory included in the facsimile device, and (b) to perform printing an image based on the received image data of internet facsimile stored in the non volatile memory included in the facsimile device; and an open confirmation processing unit configured to transmit an open confirmation email to a sender of the received email. The job managing unit is further configured to store a message ID of the email received by the mail processing unit in the non volatile memory included in the facsimile device with the received image data of internet facsimile. The open confirmation processing unit is further configured to acquire destination information for the open confirmation email from the received email corresponding to the message ID stored in the non volatile memory included in the facsimile device and transmit the open confirmation email to a destination specified by the acquired destination information using the mail processing unit.

These and other objects, features and advantages of the present disclosure will become more apparent upon reading of the following detailed description along with the accompanied drawings.

BRIEF DESCRIPTION OF THE DRAWINGS

FIG. 5 shows a sequence diagram that indicates a behavior of the image forming apparatus according to Embodiment 2 in a case that power off occurs.

DETAILED DESCRIPTION

Hereinafter, an embodiment according to an aspect of the present disclosure will be explained with reference to drawings.

Embodiment 1

Figure 1:
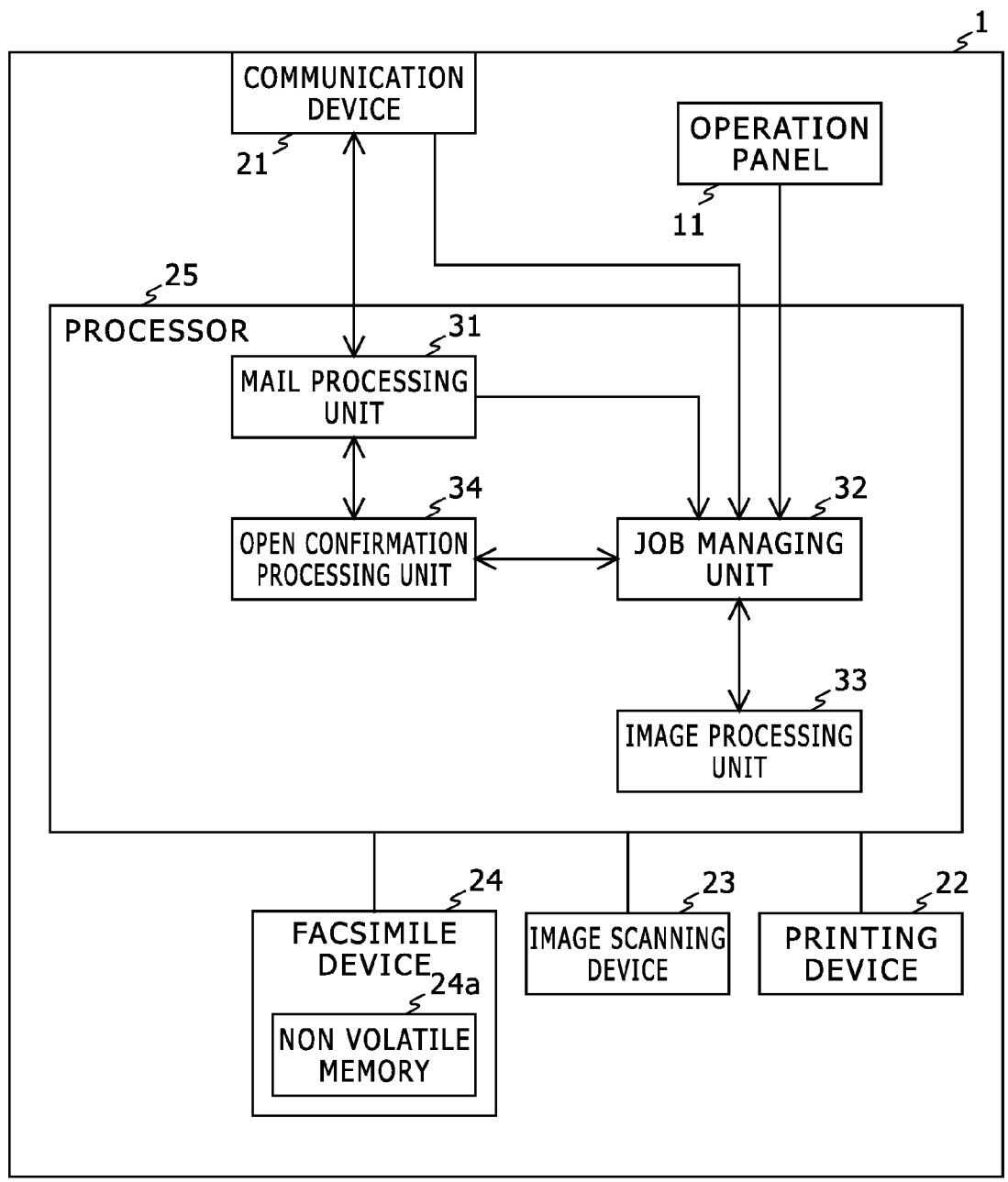
FIG. 1 shows a block diagram that indicates a configuration of an image forming apparatus according to Embodiment 1 of the present disclosure.

FIG. 1 shows a block diagram that indicates a configuration of an image forming apparatus according to Embodiment 1 of the present disclosure. The image forming apparatus 1 of Embodiment 1 has an internet facsimile function.

As shown in FIG. 1, the image forming apparatus 1 includes an operation panel 11, a communication device 21, a printing device 22, an image scanning device 23, a facsimile device 24, and a processor 25.

The operation panel 11 includes a display device such as a liquid crystal display and an input device such as a touch panel, and displays an operation screen for a user and detects a user operation.

Further, the communication device 21 is capable of connecting to another device in this system through a network, and performs data communication according to a predetermined communication protocol. The communication device 21 is connected to a computer network, and capable of communicating with a mail server on the computer network.

Furthermore, the printing device 22 is an internal device that prints a document image on a printing paper sheet, for example, in an electrophotographic manner. The printing device 22 performs printing on the basis of output image data generated by performing predetermined image processing such as rasterizing, color conversion, or a screen process for an original image data.

Furthermore, the image scanning device 23 is an internal device that optically scans a document image from a document, and generates image data of the document image.

Furthermore, the facsimile device 24 includes a non volatile memory 24a, and transmits and receives facsimile data through a telephone line and stores received image data based on the received facsimile data in the non volatile memory 24a.

If the image forming apparatus 1 is a low-cost model, the non volatile memory 24a is an on-board memory in the facsimile device 24. If the image forming apparatus 1 is a high-end model, the non volatile memory 24a includes an on-board memory and a FAX-DIMM (Dual Inline Memory Module) connected to a memory slot or the like in the facsimile device 24.

Embodiment 1 assumes that the image forming apparatus 1 is a low-cost model, and therefore does not include any non volatile large-scale data storage devices such as hard disk drives or SSDs (Solid State Drives).

Furthermore, the processor 25 is a computer which includes a CPU (Central Processing Unit), a ROM (Read Only Memory), and a RAM (Random Access Memory), loads a program from the ROM and the like to the RAM, and executes the program with the CPU to act as various processing units. Here the processor 25 acts as a mail processing unit 31, a job managing unit 32, an image processing unit 33, and an open confirmation processing unit 34.

The mail processing unit 31 accesses a predetermined mail server using the communication device 21 in accordance with a protocol such as POP3 (Post Office Protocol 3) and receives an email of internet facsimile from the mail server.

The job managing unit 32 receives a print request and a copy request based on a user operation to the operation panel 11 and a print request received from a host device and the like. If an email of internet facsimile is received, the job managing unit 32 executes a print job based on received image data obtained from the received email.

Specifically, the job managing unit 32 (a) stores the receive image data of internet facsimile in the non volatile memory 24a included in the facsimile device 24, and (b) performs printing an image based on the received image data of internet facsimile stored in the non volatile memory 24a included in the facsimile device 24.

Further, the job managing unit 32 stores a message ID of the email received by the mail processing unit 31 in the non volatile memory 24a included in the facsimile device 24 with the received image data of internet facsimile.

Furthermore, when the job managing unit 32 resumes or starts printing an image based on the received image data of internet facsimile stored in the non volatile memory 24a included in the facsimile device 24 at power resumption after power off, the job managing unit 32 reads a message ID of the received image data of internet facsimile from the non volatile memory 24a included in the facsimile device 24 and provides the read message ID to the open confirmation processing unit 34.

The image processing unit 33 performs raster image processing and generates received image data of internet facsimile based on the email received by the mail processing unit 31.

The open confirmation processing unit 34 transmits an open confirmation email to a sender of the received email.

Specifically, a unique message ID has been described in the email, and the open confirmation processing unit 34 acquires destination information for the open confirmation email from a received email corresponding to the message ID stored in the non volatile memory 24a included in the facsimile device 24, and transmits the open confirmation email using the mail processing unit 31 to a destination specified by the acquired destination information.

In Embodiment 1, the open confirmation processing unit 34 acquires a part or all of a header of the received email corresponding to a message ID stored in the non volatile memory 24a included in the facsimile device 24 from the mail server using the mail processing unit 31, and transmits the open confirmation email to a destination specified by the destination information described in the acquired part or all of the header.

The following part explains a behavior of the image forming apparatus 1 of Embodiment 1.

Figure 2:
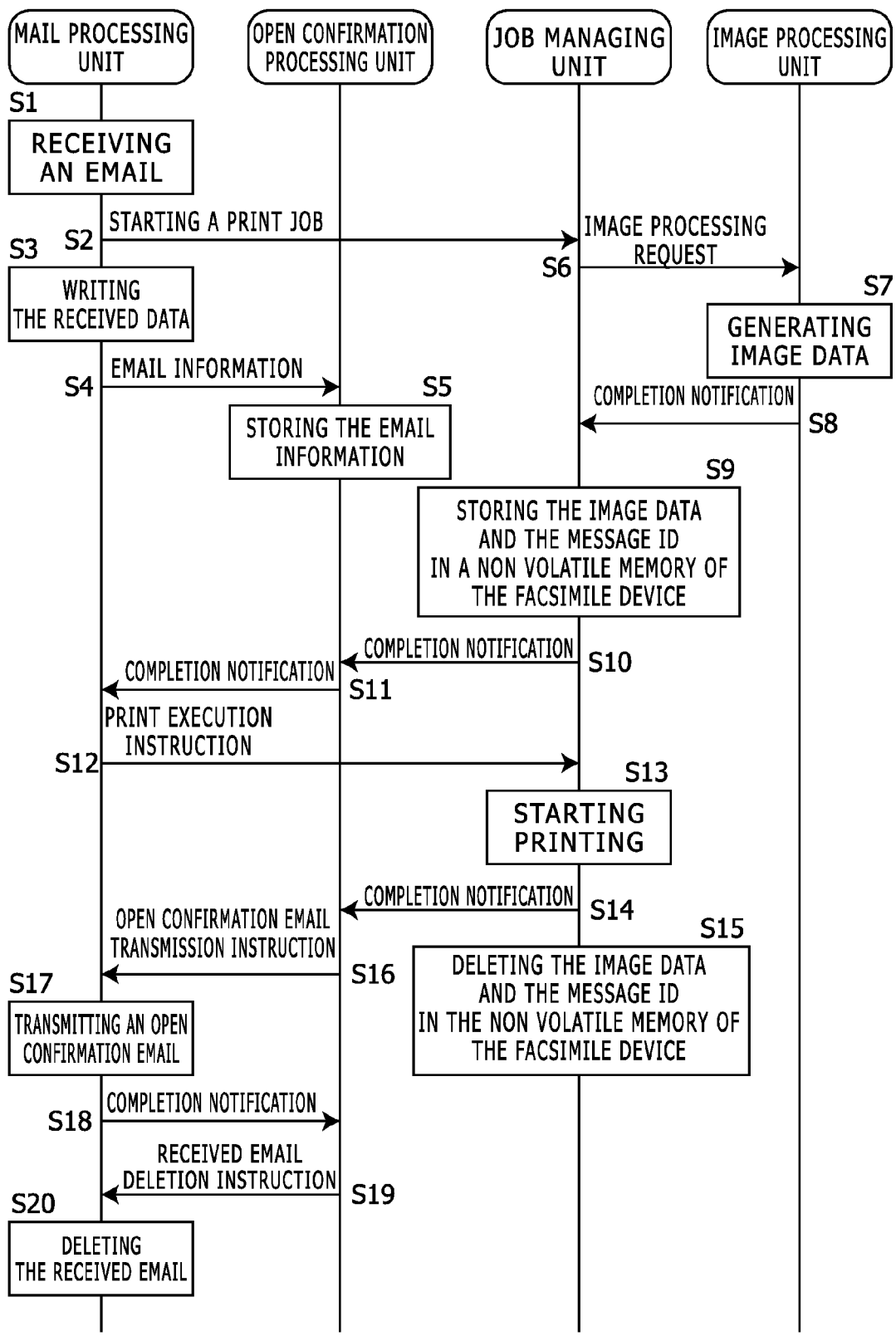
FIG. 2 shows a sequence diagram that indicates a behavior of the image forming apparatus according to Embodiment 1 in a case that power off does not occur.

Firstly explained is a behavior of the image forming apparatus 1 of Embodiment 1 in a case that power off does not occur. FIG. 2 shows a sequence diagram that indicates a behavior of the image forming apparatus 1 according to Embodiment 1 in a case that power off does not occur.

When receiving an email of internet facsimile (in Step S1), the mail processing unit 31 outputs an execution request of a corresponding print job of internet facsimile to the job managing unit 32 (in Step S2), writes data of the received email in the RAM (in Step S3), and provides a part or all of a header of the received email to the open confirmation processing unit 34 (in Step S4). The part or all of the header (hereinafter, referred as email information) includes a message ID of the received email and destination information for an open confirmation email of the received email. The open confirmation processing unit 34 stores the email information in the RAM (in Step S5).

Meanwhile, upon receiving the execution request of the print job, the job managing unit 32 outputs an image processing request to the image processing unit 33 (in Step S6). Upon receiving the image processing request, the image processing unit 33 reads the data of the email from the RAM, generates image data based on the read data and stores the image data in the RAM (in Step S7), and outputs a completion notification of generating the image data to the job managing unit 32 (in Step S8).

Upon receiving the completion notification, the job managing unit 32 reads the message ID stored by the open confirmation processing unit 34 and the image data from the RAM, stores the image data and the message ID in the non volatile memory 24a included in the facsimile device 24 so as to relate the image data and the message ID to each other (in Step S9), and outputs a completion notification of storing the image data and the message ID to the open confirmation processing unit 34 (in Step S10).

Upon receiving the completion notification, the open confirmation processing unit 34 outputs the completion notification to the mail processing unit 31 (in Step S11). Upon receiving the completion notification, the mail processing unit 31 outputs a print execution instruction to the job managing unit 32 for performing printing on the basis of the image data that storing in the non volatile memory 24a was completed (in Step S12).

Upon receiving the print execution instruction, the job managing unit 32 transfers the image data to the printing device 22 and causes the printing device 32 to perform printing (in Step S13).

Upon completing the printing, the job managing unit 32 outputs a completion notification to the open confirmation processing unit 34 (in Step S14), and deletes the image data and the message ID stored in the non volatile memory 24a (in Step S15). Upon receiving the completion notification, the open confirmation processing unit 34 generates an open confirmation email and outputs a transmission instruction of the generated open confirmation email to the mail processing unit 31 (in Step S16). In this process, the open confirmation processing unit 34 reads destination information from the RAM for the open confirmation email corresponding to the message ID of the email for which printing is completed, identifies a destination specified by the destination information, and specifies the identified destination in the transmission instruction. Subsequently, the mail processing unit 31 transmits the open confirmation email to the destination (in Step S17). Specifically, in accordance with a protocol such as SMTP (Simple Mail Transfer Protocol), controlling the communication device 21, the mail processing unit 31 accesses the mail server and transmits the open confirmation email that the destination has been set in.

Upon completing the transmission of the open confirmation email, the mail processing unit 31 outputs a completion notification to the open confirmation processing unit 34 (in Step S18). Upon receiving the completion notification, the open confirmation processing unit 34 outputs a deletion instruction of the received email corresponding to the open confirmation email (i.e. the email received in Step S1) to the mail processing unit 31 (in Step S19). Upon receiving the deletion instruction, the mail processing unit 31 transmits a deletion request of the received email to the mail server and deletes the received email in the mail server (in Step S20).

Figure 3:
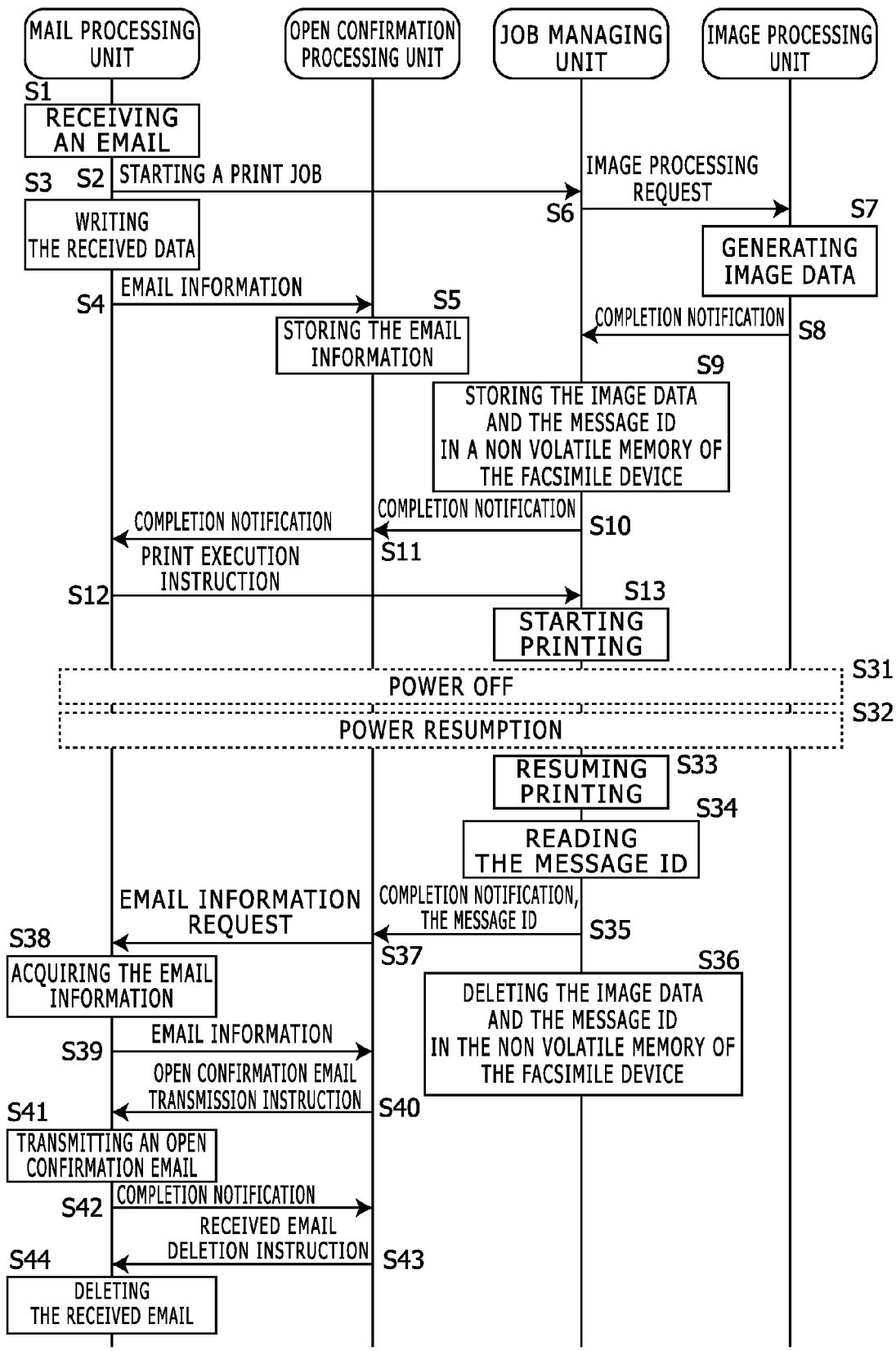
FIG. 3 shows a sequence diagram that indicates a behavior of the image forming apparatus according to Embodiment 1 in a case that power off occurs.

Contrarily explained is a behavior of the image forming apparatus 1 of Embodiment 1 in a case that power off occurs. FIG. 3 shows a sequence diagram that indicates a behavior of the image forming apparatus 1 according to Embodiment 1 in a case that power off occurs.

In this case, the email information and the image data stored in the RAM disappear due to power off. As shown in FIG. 3, when power is resumed (in Step S32) after the power off (in Step S31), if the image data remains in the non volatile memory 24*a* included in the facsimile device 24, the job managing unit 32 resumes or starts printing an image based on the image data (in Step S33). Further, the job managing unit 32 reads the stored message ID related to the image data in the non volatile memory 24*a* included in the facsimile device 24 (in Step S34).

Upon completing the printing, the job managing unit 32 outputs a completion notification and the read message ID to the open confirmation processing unit 34 (in Step S35), and deletes the image data and the message ID stored in the non volatile memory 24*a* (in Step S36).

Upon receiving the completion notification and the message ID, the open confirmation processing unit 34 outputs an email information request that specifies a message ID to the mail processing unit 31 (in Step S37). Upon receiving the email information request, the mail processing unit 31 acquires email information (i.e. a part or all of the header that includes information on necessity or not of an open confirmation email and its destination) of an email having the specified message ID from the mail server (in Step S38), and provides the acquired email information to the open confirmation processing unit 34 (in Step S39).

Upon receiving the email information, the open confirmation processing unit 34 generates an open confirmation email, and outputs a transmission instruction of the generated open confirmation email to the mail processing unit 31 (in Step S40). In this process, the open confirmation processing unit 34 specifies a destination of the open confirmation email in the transmission instruction and this destination is a destination specified by the destination information for the open confirmation email in the email information. Subsequently, the mail processing unit 31 transmits the open confirmation email to the destination (in Step S41).

Upon completing the transmission of the open confirmation email, the mail processing unit 31 outputs a completion notification to the open confirmation processing unit 34 (in Step S42). Upon receiving the completion notification, the open confirmation processing unit 34 outputs a deletion instruction of the received email corresponding to the open confirmation email (i.e. the email received in Step S1) to the mail processing unit 31 (in Step S43). Upon receiving the deletion instruction, the mail processing unit 31 transmits a deletion request of the received email to the mail server and deletes the received email in the mail server (in Step S44).

In the aforementioned Embodiment 1, the job managing unit 32 stores a message ID of an email of internet facsimile received by the mail processing unit 31 with received image data obtained from the received email, and the open confirmation processing unit 34 acquires destination information described in a received email corresponding to a message ID stored in the non volatile memory 24*a* included in the facsimile device 24 for an open confirmation email of the received email and transmits the open confirmation email to a destination specified by the acquired destination information using the mail processing unit 31.

As mentioned, the relation has been saved between received image data and a message ID of a received email of internet facsimile corresponding to the received image data, and even if power off occurs, the saved relation enables to identify the destination of the open confirmation email as a destination described in the email having the message ID. Therefore, in the internet facsimile function, even if power off occurs before transmitting the open confirmation email and after storing the received image data in the non volatile memory 24*a* included in the facsimile device 24, the open confirmation email is successfully transmitted.

Embodiment 2

Figure 4:
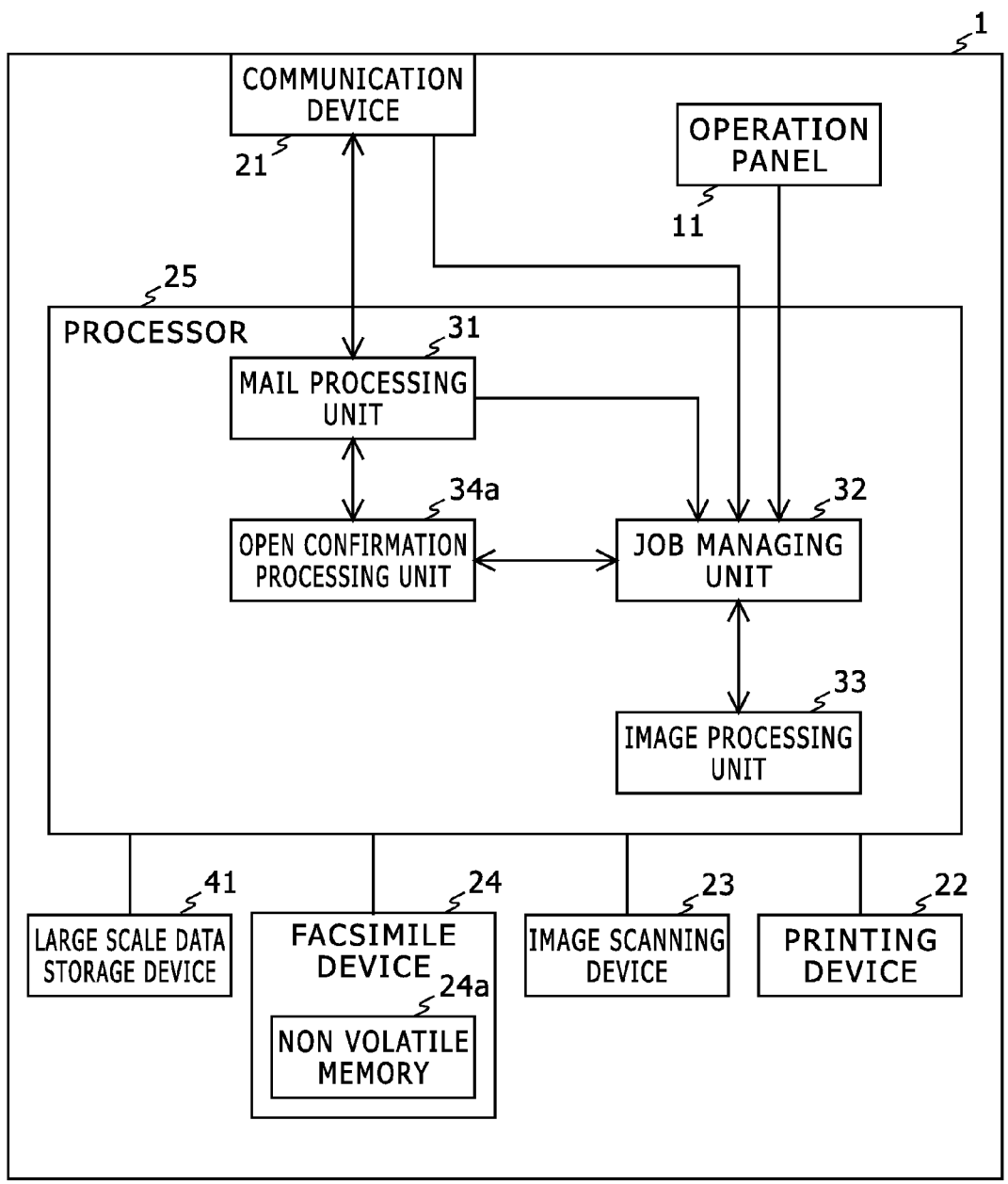
FIG. 4 shows a block diagram that indicates a configuration of an image forming apparatus according to Embodiment 2 of the present disclosure.

FIG. 4 shows a block diagram that indicates a configuration of an image forming apparatus 1 according to Embodiment 2 of the present disclosure. The image forming apparatus 1 of Embodiment 2 is a high-end model and includes a built-in non volatile large-scale data storage device 41 such as a hard disk drive or a SSD.

In Embodiment 2, the processor 25 acts as an open confirmation processing unit 34*a* instead of the open confirmation processing unit 34.

The open confirmation processing unit 34*a* saves a part or all of a header of the received email (corresponding to a message ID stored in the non volatile memory 24*a*) in the non volatile large-scale data storage device 41 so as to relate the part or all of the header to the message ID of the received email, reads the part or all of the header related to the message ID from the non volatile large-scale data storage device 41, and transmits the open confirmation email corresponding to the received email having the message ID to a destination specified by the destination information described in the read part or all of the header.

Other components in the image forming apparatus 1 shown in FIG. 4 are the same as those in Embodiment 1 (FIG. 1) and therefore not explained here.

The following part explains a behavior of the image forming apparatus 1 of Embodiment 2. FIG. 5 shows a sequence diagram that indicates a behavior of the image forming apparatus according to Embodiment 2 in a case that power off occurs.

In Embodiment 2, upon receiving the email information from the mail processing unit 31 (in Step S4), the open confirmation processing unit 34a saves the received email information in the large-scale data storage device 41 (in Step S51).

After power is resumed (in Step S32), upon receiving the completion notification and the message ID from the job managing unit (in Step S35), the open confirmation processing unit 34a reads the email information that includes the message ID from the large-scale data storage device 41 (in Step S52), and identifies destination information for the open confirmation email in the email information.

Other behaviors of the image forming apparatus 1 shown in FIG. 4 are the same as those in Embodiment 1 (FIGS. 2 and 3), and therefore not explained here.

In the aforementioned Embodiment 2, since the image forming apparatus 1 includes the built-in large-scale data storage device 41 used for saving the email information, it is not required to acquire the email information from the mail server (in Steps S37 to S39 in FIG. 3).

The description has been presented for purposes of illustration and description, and is not intended to be exhaustive or limited.

For example, in the aforementioned Embodiment 1 or 2, the open confirmation processing unit 34 or 34a may be configured to save the part or all of the header of the email in the non volatile memory 24a rather than the large-scale data storage device 41, read the part or all of the header from the non volatile memory 24a, and transmit the open confirmation email to the destination specified by the destination information described in the read part or all of the header.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus that has an Internet facsimile function, comprising:
    a facsimile device that includes a nonvolatile memory in which received image data of the Internet facsimile function is stored; said nonvolatile memory including one of an on-board memory and a FAX dual inline memory module connected to a memory slot;
    a mail processing unit that receives an email of the internet facsimile function from a mail server; said email containing a message ID that identifies said email;
    an image processing unit that generates received image data of the internet facsimile function on the basis of the email received by the mail processing unit;
    a job managing unit (a) stores a message ID of the email by the mail processing unit, the message ID being related to the received image data of the internet facsimile function in the nonvolatile memory included in the facsimile device, and (b) performs printing of an image based on the received image data of the internet facsimile function stored in the nonvolatile memory included in the facsimile device; and
    an open confirmation processing unit acquires a part or all of a header of the received email corresponding to the message ID stored in the non volatile memory from the mail server using the mail processing unit, and transmits an open confirmation email to a destination specified by the acquired part or all of the header;
    wherein when power is resumed after power off, the job managing unit resumes or starts printing the image based on the received image data in the nonvolatile memory, and reads the stored message ID related to the received image data in the nonvolatile memory;
    when a printing of the image is completed, the job managing unit outputs a completion notification of the printing and the read message ID to the open confirmation processing unit, and deletes the image data and the message ID stored in the non volatile memory;
    when the completion notification and the message ID is received, the open confirmation processing unit outputs an email information request that specifies the message ID to the mail processing unit;
    when the email information request is received, the mail processing unit acquires email information of the email having the message ID related to the received image data from the mail server, and provides the acquired email information to the open confirmation processing unit, the email information including the part or all of the header that has information on necessity or not of the open confirmation email and destination information;
    when the email information is received, the open confirmation processing unit specifies the destination for the open confirmation email, generates the open confirmation email, and outputs a transmission instruction of the generated open confirmation email to the mail processing unit, the destination being a destination specified by the destination information for the open confirmation email in the email information;
    the mail processing unit transmits the open confirmation email to the destination;
    when a transmission of the open confirmation email is completed, the mail processing unit outputs a completion notification of the transmission to the open confirmation processing unit;
    when the completion notification of the transmission is received, the open confirmation processing unit outputs a deletion instruction of the received email corresponding to the open confirmation email to the mail processing unit; and
    when the deletion instruction is received, the mail processing unit transmits a deletion request of the received email to the mail server and deletes the received email in the mail server.

* * * * *